US008893267B1

(12) United States Patent
Sathe et al.

(10) Patent No.: US 8,893,267 B1
(45) Date of Patent: Nov. 18, 2014

(54) SYSTEM AND METHOD FOR PARTITIONING RESOURCES IN A SYSTEM-ON-CHIP (SOC)

(75) Inventors: Satish Sathe, San Ramon, CA (US); Perrine Peresse, Tourrettes sur Loup (FR); Anjan Rudra, Maharashtra (IN); Keyur Chudgar, San Jose, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 73 days.

(21) Appl. No.: 13/212,112

(22) Filed: Aug. 17, 2011

(51) Int. Cl.
*G06F 7/04* (2006.01)
*G06F 21/31* (2013.01)

(52) U.S. Cl.
CPC ..................................... *G06F 21/31* (2013.01)
USPC .................. 726/21; 711/163; 711/153; 713/2

(58) Field of Classification Search
CPC .............. G06F 12/084; G06F 12/0842; G06F 12/0848; G06F 12/145; G06F 12/1483; G06F 2221/2149; G06F 9/5077
USPC ......................................................... 726/21
See application file for complete search history.

(56) References Cited

U.S. PATENT DOCUMENTS

| 5,475,839 | A  | * | 12/1995 | Watson et al. ..................... 713/2 |
| 7,006,505 | B1 | * | 2/2006  | Bleszynski et al. ...... 370/395.72 |
| 2005/0203988 | A1 |  | 9/2005  | Nollet et al. |
| 2006/0218328 | A1 |  | 9/2006  | Vega et al. |
| 2007/0061521 | A1 | * | 3/2007  | Kelly et al. ................... 711/147 |
| 2008/0028408 | A1 |  | 1/2008  | Day et al. |
| 2008/0126553 | A1 | * | 5/2008  | Boucher et al. ............... 709/230 |
| 2008/0184258 | A1 |  | 7/2008  | Toyama |
| 2008/0196043 | A1 |  | 8/2008  | Feinleib et al. |
| 2009/0133028 | A1 | * | 5/2009  | Brown et al. .................. 718/104 |
| 2010/0122077 | A1 |  | 5/2010  | Durham |
| 2010/0146620 | A1 | * | 6/2010  | Simeral et al. .................. 726/21 |
| 2010/0235598 | A1 | * | 9/2010  | Bouvier ........................ 711/163 |
| 2010/0287339 | A1 |  | 11/2010 | Olszewski et al. |

OTHER PUBLICATIONS

Freescale Semiconductor White Paper; Hardware and Software Assists in Virtualization; Aug. 2009, Rev 0; Doc. No. P4080VRTASTWP, Freescale Semiconductor Inc.; Tempe, AZ.
Theelen, Bart D.; Multi Micro Processor (MuP): A MPSoC Platform with Hardware OS; www.ics.ele.tue.nl/~btheelen/projects/mup/; 2008; Electronic Systems Group; USA.

(Continued)

*Primary Examiner* — Nirav B Patel
*Assistant Examiner* — Mohammed Waliullah
(74) *Attorney, Agent, or Firm* — Amin, Turocy & Watson, LLP (57) ABSTRACT In a system-on-chip (SoC), a method is provided for partitioning access to resources. A plurality of processors is provided, including a configuration master (CM) processor, a memory, a plurality of OSs, and accessible resources. The method creates a mapping table with a plurality of entries, each entry cross-referencing a range of destination addresses with a domain ID, where each domain ID is associated with a corresponding processor. Access requests to the resource are accepted from the plurality of processors. Each access request includes a domain ID and a destination address. A mapping table is consulted to determine the range of destination addresses associated with the access request domain IDs. The accesses are authorized in response to the access request destination addresses matching the range of destination addresses in the mapping table, and the authorized access requests are sent to the destination addresses of the requested resources.

24 Claims, 3 Drawing Sheets

(56) References Cited

OTHER PUBLICATIONS

Mentor Graphics Datasheet; Mentor Embedded Multi-OS on Multicore Solutions; MGC 04-10 1028040; Mentor Graphics Corp.; Wilsonville, OR.

Warner, John & Bhal, Sanjay & Flanagan, Tom; Realizing Full Multicore Entitlement; Texas Instruments White Paper; 2010; Texas Instruments, Inc.; Dallas, TX.

Burger, Thomas Wolfgang; Intel Virtualization Technology for Directed I/O (VT-d), etc.: http://software.intel.com/en-us/articles/; not dated; Intel Corp.; USA.

* cited by examiner

SYSTEM AND METHOD FOR PARTITIONING RESOURCES IN A SYSTEM-ON-CHIP (SOC)

BACKGROUND OF THE INVENTION

1. Field of the Invention

This invention generally relates to a system-on-chip (SoC) with a plurality of processors and, more particularly, to a hardware-based system and method for partitioning resources between SoC processors.

2. Description of the Related Art

As noted in Wikipedia, a hypervisor, or virtual machine manager (VMM), is a hardware virtualization technique that allows multiples operating systems (OSs), termed guest OSs, to run concurrently on the same processor. It is so named because it is conceptually one level higher than a supervisory program. The hypervisor presents to the guest operating systems a virtual operating platform and manages the execution of the guest operating systems. Multiple instances of a variety of operating systems may share the virtualized hardware resources. Hypervisors are installed on server hardware whose only task is to run guest operating systems Non-hypervisor virtualization systems are used for similar tasks on dedicated server hardware, but also commonly on desktop, portable, and even handheld computers.

Hypervisors have been developed for machines using the Intel x86 instruction set, including conventional desktop PCs. The x86 architecture used in most PC systems poses particular difficulties to virtualization. Full virtualization (presenting the illusion of a complete set of standard hardware) on x86 has significant costs in hypervisor complexity and run-time performance. An alternative approach requires modifying the guest operating-system to make system calls to the hypervisor, rather than executing machine I/O instructions which the hypervisor then simulates.

Symmetric multiprocessing (SMP) involves a multiprocessor computer hardware architecture where two or more identical processors are connected to a single shared main memory and are controlled by a single OS instance. Most common multiprocessor systems today use a SMP architecture. In the case of multi-core processors, the SMP architecture applies to the cores, treating them as separate processors. Processors may be interconnected using buses, crossbar switches, or on-chip mesh networks. The bottleneck in the scalability of SMP using buses or crossbar switches is the bandwidth and power consumption of the interconnect among the various processors, the memory, and the disk arrays. Mesh architectures avoid these bottlenecks, and provide nearly linear scalability to much higher processor counts at the sacrifice of programmability. Serious programming challenges remain with this kind of architecture because it requires two distinct modes of programming, one for the CPUs themselves and one for the interconnect between the CPUs. A single programming language would have to be able to not only partition the workload, but also comprehend the memory locality, which is severe in a mesh-based architecture.

Other systems include asymmetric multiprocessing (AMP), which uses separate specialized processors for specific tasks (which increases complexity). Examples of AMP include many media processor chips that are a relatively slow base processor assisted by a number of hardware accelerator cores. High-powered 3D chipsets in modern videocards could be considered a form of asymmetric multiprocessing.

In a multi-processor SoC hardware, support may be provided with additional privilege levels in a memory management unit controlled by a virtual OS. The virtual OS then partitions the hardware so the guest OSs can operate in their own partition and are isolated from the other OSs. Additionally, some multi-processor SoCs may provide a means of partitioning the memory visible to the IO subsystem so that each guest OS memory partition can be accessed by IO devices. Both of these methods require virtualization software that must operate on the same multi-processor SoC and must swap out the guest OS in order to reconfigure the partitions. Additionally, these SoCs provide partitioning but do not provide a means of provisioning the resources, whereby a resource can be provisioned to provide a certain performance to one guest OS and a different performance to another guest OS.

The virtual OS may also require the processors to operate in SMP mode so that it can coordinate the requests between the multiple guest OSs. This can cause performance to degrade for the two guest OSs since any cacheable request made by one guest OS operating on one processor will result in a snooping of the other processor caches unnecessarily. Additionally, the unnecessary snoop bandwidth will also result in increased power dissipation as the interconnect fabric and the caches have to be designed to accommodate the additional snoop requests. Thus, the methods currently in use require additional software, which increases the cost, degrades performance, and does not provide any bandwidth provisioning.

It would be advantageous if a multicore core system-on-chip device could be provisioned in a manner to allow multiple operating systems to use shared and dedicated resources without impacting each other's performance.

SUMMARY OF THE INVENTION

Disclosed herein is a method to partition, provision, and protect shared resources within a multi-processor system-on-chip (SoC) device. Multi-processor devices may be used with different operating systems loaded on one or a group of processors, with each operating system having no knowledge that the other operating systems exist on the same platform and are sharing some of the platform resources. Each operating system on that SoC behaves as if it is the only operating system and that it owns a unique set of SoC resources.

The multi-processor SoC efficiently supports multiple operating systems running on different processors without any changes to conventional operating system software and without the need for virtualization software or a processor that supports hypervisor privilege levels. It provides a method in which the SoC can be partitioned into sections that are only accessible by the operating systems of configured processors. It provides a method in which certain resources can be shared between the processors by provisioning a configured amount of bandwidth per processor. Additionally, it provides a mechanism of protecting each partition from an inadvertent or unauthorized access from other operating systems. Each operating system can be individually rebooted and initialized without any impact on the other operating systems. These advantages are provided without any architectural changes to conventional processor design, and without any processing overhead or virtualization software. This low cost, easy to use approach allows multiple operating systems to share the same multi-processor SoC platform. Additionally, this approach also provides bandwidth guarantees where a given operating system is guaranteed a certain bandwidth and performance from the shared resources regardless of the other operating systems.

More explicitly, a virtual OS is eliminated by implementing a separate microcontroller, with additional partitioning and provisioning hardware logic in the SoC. This partitioning microcontroller does away with any requirement for a virtualization OS that runs on the processors, removes all performance impacts, and allows provisioning of the performance per guest OS. Additionally, because the feature is implemented on a completely separate microcontroller, it can be protected from inadvertent or malicious corruption, thus providing an additional level of robustness.

Accordingly, in a SoC with a plurality of operating systems (OSs), a method is provided for partitioning access to resources. The SoC includes a plurality of processors, including a configuration master (CM) processor, a memory, a plurality of OSs, and accessible resources divided into a plurality of domains. The method creates a mapping table with a plurality of entries, each entry cross-referencing a range of destination addresses with a domain ID), where each domain ID is associated with a corresponding processor. Access requests to the resource are accepted from the plurality of processors. Each access request includes a domain ID) and a destination address. A mapping table is consulted to determine the range of destination addresses associated with the access request domain IDs. The accesses are authorized in response to the access request destination addresses matching the range of destination addresses in the mapping table, and the authorized access requests are sent to the destination addresses of the requested resources.

If an access request is not authorized in response to the access request domain ID not cross-referencing to the range of destination addresses in the mapping table, then access to the requested resource is denied. In one aspect, a domain violation sideband message is sent to the requesting processor and to the CM processor, in response to denying access to a resource.

Additional details of the above-described method, and a SoC with a system for partitioning access to resources, are provided below.

DETAILED DESCRIPTION

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The computer devices described below typically employ a computer system with a bus or other communication mechanism for communicating information, and a processor coupled to the bus for processing information. The computer system may also include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with partitioning SoC resources. Alternately, these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 1:
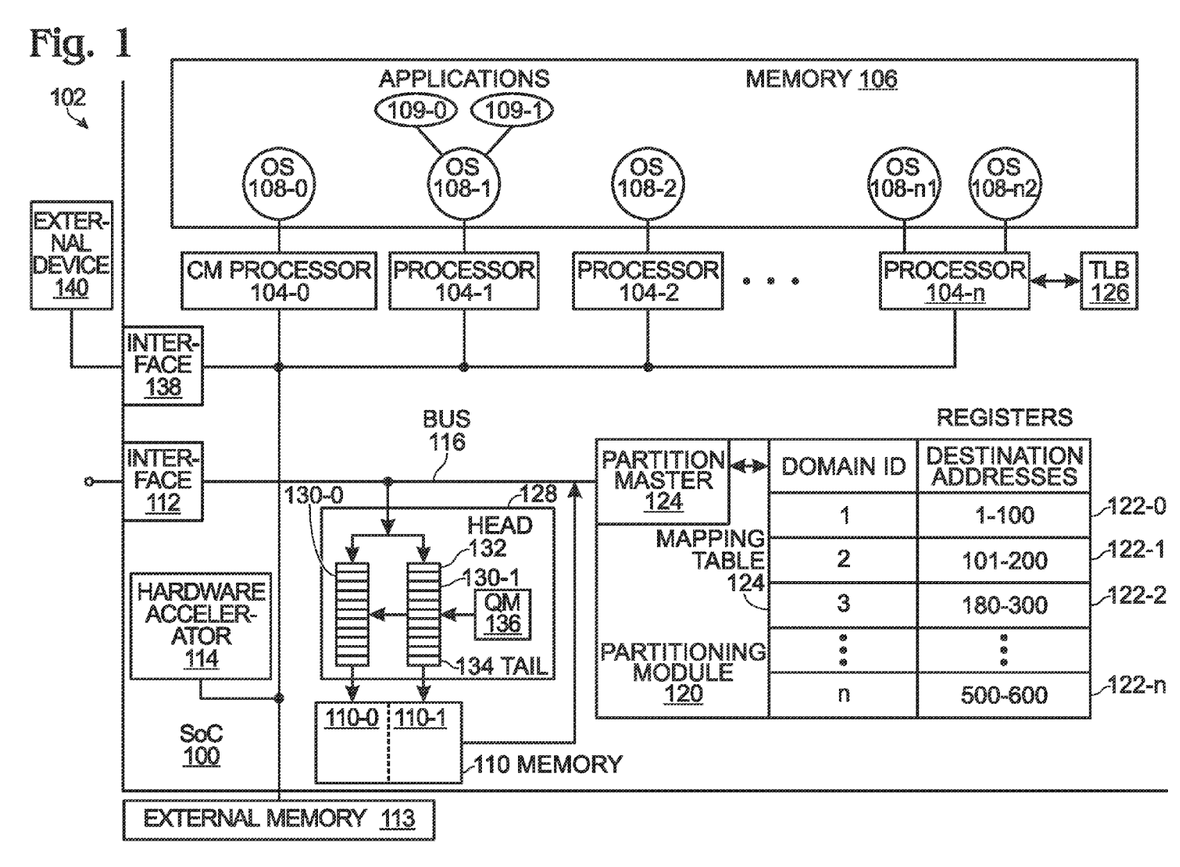
FIG. 1 is a schematic block diagram of a system-on-chip (SoC) with a plurality of operating systems (OSs) and a system for partitioning access to resources.

FIG. 1 is a schematic block diagram of a system-on-chip (SoC) 100 with a plurality of operating systems (OSs) and a system for partitioning access to resources. The system 102 comprises a plurality of processors 104-0 through 104-n, including a configuration master (CM) processor 104-0, where n is an integer variable greater than 1. The system also comprises a memory 106, and a plurality of OSs 108-0 through 108-m enabled as a sequence of software instructions stored in the memory 106, executable by a processor 104. (m) is an integer variable greater than 1. Each OS 108 may be running one or more applications enabled as a sequence of software instructions stored in memory. For example, OS 108-1 is shown running applications 109-0 and 109-1.

The system 102 typically includes accessible resources divided into a plurality of domains. For example, the accessible resources may be an internal memory 110, an interface 112, external memory 113, and a computer hardware accelerator 114. For example, memory 110 may have a first domain 110-0, with a first domain ID assigned to a first processor (e.g. processor 104-1), and a second domain 110-1, with a second domain ID assigned to both the first processor 104-1 and a second processor (e.g., processor 104-2). Any interface or accelerator could be shared. Examples of interfaces are Ethernet, PCI Express, USB, SATA (Serial Advanced Technology Attachment), etc. A hardware acceleration is the use of hardware to perform some function faster than is possible in software running on the general purpose processor. Examples of hardware acceleration include blitting acceleration functionality in graphics processing units (GPUs) and instructions for complex operations in CPUs.

More generally, the resources of the SoC 100 may be separated into three groups—memories, virtualized IP hardware accelerators, and non-virtualized IP accelerators. Each group has its own requirements for sharing and protection, but there are also many similarities in what is needed to provide these capabilities. The memory may, for example, be double data rate-3 (DDR3), OCM (on-chip memory), or NAND/NOR flash memory. It may be partitioned and dedicated to specific processors, or shared between processors. Examples of virtualized IP include message passed IPs (Ethernet, Pkt-DMA, Context Manager, Security, and Classifier) and QMTM (queue management/traffic management). Examples of non-virtualized IPs include slave mode IPs (SATA, USB, SD (secure digital)) and IPs with external mastering (PCIe (peripheral component interconnect), and Expansion Bus (EBUS). These are hardware accelerators that respond to commands generated by some other entity from within the device. For example, a SATA port may read and write data from an external drive when the processor sends it commands to do so. This is in contrast with an interface like PCIe, where an external device can generate a read or write request in addition to an internal processor generating a read or write request.

For simplicity, all the above-mentioned elements are shown connected via a common bus 116. However, as well understood in the art, multiple buses may be used.

A partitioning module 118 includes a mapping table 120 comprised of a plurality of registers 122-0 through 122-n. Each register 122 cross-references a range of destination addresses with a domain ID, where each domain ID is associated with a corresponding processor. The partitioning module 118 has an interface on bus 116 to accept access requests to the resource from the plurality of processors 104. Each access request includes a domain ID and a destination address. More explicitly, the OS 108 (or application) associated with a processor 104 may enable an access (read or write) request, and the processor adds the domain ID) to the request when it is sent to the partitioning module 118. In one aspect, the CM processor 104-0 programs registers, with domain IDs and associated processors. Any time a read or write request is made by the OS operating on that processor, the contents of that register are sent along with the read or write request to the mapping table.

A partition master 124 accesses the range of destination addresses associated with the domain ID, and authorizes the access in response to the access request destination address matching the range of destination addresses in the mapping table. An interface on bus 116 sends the authorized access requests to the destination addresses of the requested resources, Again for simplicity, the interfaces to the partitioning module are enabled through bus 116, but other bus schemes can also be used to enable the system 102.

The system of 102 is able to quickly and easily enable provisioning by assigning resources to processors. The CM processor 104-0 is able to write destination addresses and associated domain IDs into the partitioning module mapping table 120 or modify the destination addresses and associated domain IDs in the partitioning module mapping table.

If the partition master 124 fails to authorize an access request in response to the access request domain ID (e.g., the domain ID of processor 104-1) not cross-referencing to the range of destination addresses in the mapping table, it denies access to the requested resource. In one aspect, the partition master 124 sends a domain violation sideband message to the requesting processor 104-1 and to the CM processor 104-0, in response to denying access to a resource. Sideband messages are messages sent by a dedicated interconnect or bus.

In another aspect, the CM processor 104-0 sends an interrupt message to an associated OS 108-0 in response to receiving a domain violation sideband message that processor 104-1 initiated an unauthorized access. The OS 108-0 associated with the CM processor 104-0 may force OS 108-1, associated with processor 104-1 to reboot. Alternatively or in addition, OS 108-0 may monitor the number of unauthorized accesses made by OS 108-1, and halt OS 108-1 if unauthorized accesses occur after rebooting.

The requesting processor 104-i may send an interrupt message to associated OS 108-1 in response to receiving a domain violation sideband message that the OS 108-1 initiated an unauthorized access. Then, OS 108-1 may perform a security operation such as rebooting or halting a software application running on the first OS.

In one aspect of the system, there is a one-to-one correspondence between processors and OSs, as shown with processor 104-0, 104-1, and 104-2. In another aspect, the mapping table 120 cross-references a first range of destination addresses to a domain ID, associated with a processor (e.g., processor 104-n). In this aspect, OS 108-n1 and 108-n2 are associated with processor 104n. A translation lookaside buffer (TLB) 126 is managed by processor 104-n.

A TLB 126 is a cache that memory management hardware uses for virtual addresses by mapping virtual addresses to physical addresses. The TLB 126 may be implemented as content-addressable memory (CAM). The CAM search key is the virtual address and the search result is a physical address. If the requested address is present in the TLB, the CAM search yields a match quickly and the retrieved physical address can be used to access memory. This is called a TLB hit.

In this particular case, the TLB 126 includes a first sub-field of destination addresses from the first range cross-referenced to a first virtual domain ID and associated with OS 108-n1. The TLB 126 also includes a second sub-field of destination addresses from the first range cross-referenced with the second virtual domain ID and associated with OS 108-n2.

In another aspect, an accessible resource (e.g., memory 110) has destination addresses associated with a first domain ID assigned to processor 104-1 and a second domain ID assigned to processor 104-2. In this aspect, the system 102 further comprises a resource traffic management QMTM) subsystem 128 that includes a plurality of input first-in first-out (FIFO) queues connected to the first accessible resource 110, including a first input FIFO 130-0 associated with the first domain ID (processor 104-1) and a second input FIFO queue 130-1 associated with the second domain ID (processor 104-2). Each FIFO queue 130 has a head 132 to accept authorized access requests and a tail 134 connected to the memory 110. A queue manager (QM) 136 selects between the input FIFOs 130. The selection criteria may, for example, be based on fairness of one of the processors having a higher priority.

In this example, it should be noted that the resource management traffic subsystem may gate access to a resource divided into separate domains, or a resource where a range of destination addresses are shared between a number of processors. Although only one resource management traffic subsystem is depicted, it should be understood that a separate subsystem may exist for each resource that is accessed by more than one processor.

In another aspect, the SoC 100 has an external interface 138 to receive an access request to a first destination address. For example, the access request may be sourced from an external device 140 such as an off-SoC processor. The access request is sent to the partitioning module 120 with the first destination address and a domain ID associated with the external device. The partition master 124 authorizes the access in response to accessing the range of destination addresses associated with the external device domain ID and matching the range of destination addresses in the mapping table 124 with the external device 140. In one aspect there may be a plurality of external devices, each with a corresponding domain ID.

Functional Description

The system of FIG. 1 uses a combination of hardware and software in order to partition and provision the SoC. A separate CM processor is used to configure the SoC. The CM processor is embedded into the SoC and is used for partitioning and provisioning the resources as required by the guest OSs. The CM processor boots up before the guest OSs and partitions the SoC in the desired fashion. The system uses the concept of a domain, where a unique domain is assigned to each processor, or any interface that can process requests generated from an external device (e.g., via a PCIexpress port).

The system also uses the concept of a configuration master. The configuration master is the only entity that is allowed to change the partitioning and provisioning of the SoC. One of the entities (processor or external requester) that is assigned a domain, can also be the configuration master. It is possible for more than one entity to be a configuration master.

A domain mapping table is used to check the domain ID of the requester for every access, to verify access rights, and it only allows those accesses that are authorized to make that type of access. Any violations are reported to the violating domain processor as well as to the configuration master, and the violating access is disallowed. For write accesses, the data is discarded and the target of the access is not modified. For read accesses, a read error is reported with the access and a data of all 0's may be returned to the requester.

The domain mapping table specifies an address range, the domain IDs that are allowed to access that range, and the type of access that is allowed for that range.

The system supports non-virtualized IP sharing and protection. Each non-virtualized IP (e.g., SATA, USB) is assigned an IP domain ID, permitting the IP domain ID to be assigned to a particular processor, including the CM or an IP dedicated processor. Thus, whenever a transaction is generated from the non-virtualized IP, the address used will either map into a processor address space, or an unassigned address space. Note: the this IP domain ID can be reprogrammed by the configuration master so the particular processor used by that IP can be changed over time depending on which requester is using that IP. The IP domain ID is the ID of the processor that is allowed to access that IP at that given time. If at a later time, another processor wishes to access that IP, then it makes a request to the configuration master to allow it access to that IP. The configuration master then reprograms the IP domain ID to indicate the new processor, provided the previous processor has finished its accesses, and provided the new processor is allowed to make that access.

The system also supports non-virtualized IP with external mastering capability (PCIe without SRIOV, EBUS) resource sharing and partitioning. Having a separate address space that does not belong to any of the processors, including the CM, permits the SoC to support memory sharing with remote (external) devices as well. If an address space is to be shared between an external master (external device) and an SoC processor, then both devices can be assigned the same domain ID. However, if the external device or IP is to have its own range of dedicated memory, then it is assigned a unique domain ID. For example, an external device connected to the SoC via a PCIe interface can have its own address space within off-chip (e.g., DDR) memory managed by the SoC. The IP domain ID field can be expanded in order to allow more IP specific partitions. For example, there can be a PCIe (physical function—with its own set of registers, address space, and capabilities to IP domain ID) mapping, or a USB device to IP domain ID mapping that allows support of additional partitions.

There are a set of non-virtualized IPs such as PCIe and EBUS that are memory mapped, but that can also have inbound requests that are not sourced by any processors or the CM. For such IPs, the resource sharing logic implements components of the memory sharing and protection logic as well as the non-virtualized IP sharing and protection logic. In this manner, outbound requests can be checked to ascertain that the requester domain ID is allowed to access the requested memory range, and inbound requests can be assigned an IP specific domain ID that can be checked by other resources to ascertain that the external device is making a valid request. Note: there is no need to tag the response of an outbound request because all domain ID checking is done on requests, not on responses.

Figure 3:
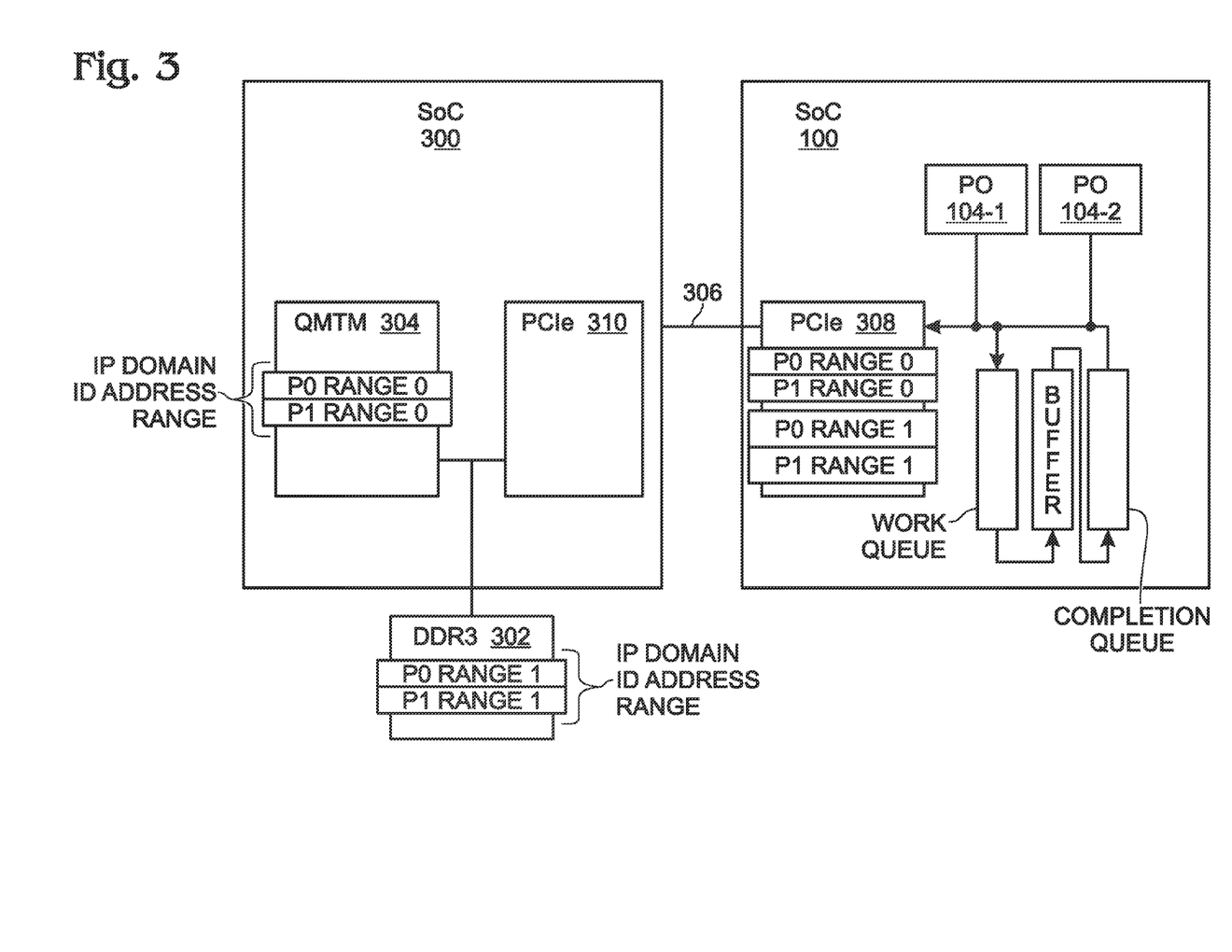
FIG. 3 is a schematic block diagram depicting non-virtualized IP with external mastering capability resource sharing and protection.

FIG. 3 is a schematic block diagram depicting non-virtualized IP with external mastering capability resource sharing and protection. In one aspect, the PCIe and EBUS IPs have two address ranges per entry in the domain mapping table so that two non-contiguous address spaces can be associated with each requester domain ID. The two ranges allow a processor on one SoC 100 to access the external (e.g., DDR3) memory 302 and QMTM address space 304 of another SoC 300 connected to it via a PCIe interface on line 306, and thus provide true resource sharing and protection on a system wide basis. The PCIe 308 and 310 are interfaces that connect the two processors together. So, anytime SoC 100 generates a request to SoC 300 via the PCIe bus on line 306, and domain mapping has been implemented in SoC 300. When that request gets to PCIe port 308, it is assigned a domain ID and that request is now checked in domain ID 300. The QMTM 304 maps multiple queues to the same destination (e.g., memory 302) and returns the completion queues to the appropriate processor.

The system supports sharing and protection of virtualized IP. In one aspect, virtualized IPs copy the source domain ID from a free queue to a completion queue when it gets a free pool buffer and uses it to store incoming data or processing results. For example, a particular IP performs the task of calculating a checksum over some data that is provided to it as input, and then writes the result somewhere when it is done. One way the IP could do this is by fetching a buffer from a free pool and writing the result into the free pool buffer. Then, if that IP is processing a task from a particular processor, it should only use free pool buffers that belong to that processor. So, the IP must use a free pool buffer that belongs to the requesting processor as well. In this case, the IP is making a request to get the free pool buffer, and since every request must have a domain ID associated with it, the IP uses the domain ID that was sent to it originally when the processor made the request to calculate the checksum. Once the IP has made a request to get a buffer from a free pool, and received one because the domain ID is allowed to access that free pool, and if the IP wants to write the resulting checksum into the buffer and send a completion status, it uses the domain ID of the free pool.

The virtualized IPs copy the source domain ID from a work queue to the completion queue when it gets a work message that it operates on. If an IP gets a work message and also a free pool buffer, then it should use the source domain ID from the free pool buffer. This is advantageous since an IP such as the look aside classifier may mirror a packet to two different resources, and it would need to insure that whatever buffers it uses has the domain ID that belongs to the requester rather than the domain ID of the incoming work message.

As another example, a classifier can be only programmed by the configuration master. The classifier is an IP that parses an incoming packet in order to determine to which processor (and therefore domain ID) the packet should be sent. Thus, the configuration master can guarantee that a packet that is to be delivered to a particular domain only uses buffers from free pool queues that belong to that domain ID and only delivers completion messages to completion queues that belong to that domain ID as well. On Ethernet ingress paths, the classifier provides a Free Pool Select (FPSel) to the Ethernet and the Ethernet finds out the domain ID from the freepool message itself. On Ethernet ingress (with in line classifier) device, no specific check is done but many other checks are performed on the data/message path.

Since an incoming Ethernet packet does not have a domain ID associated with it, the associated domain ID and associated processor must be determined when storing that packet. Moreover, the packet can be a multicast packet which needs to be forwarded to more than one processor and domain ID. In this case, rather than storing a domain ID in the classifier that is associated with that packet, a value is stored that indicates which free pool(s) should use to store the packet. The descriptors in the free pool buffer(s) in turn contain the domain ID to which they belong, so the Ethernet port now has the domain ID that should be used for storing that packet. Since the classifier can only be programmed by the configuration master, it is insured that the packet can only be forwarded, and can only use the authorized free pool.

The Ethernet work message, which a descriptor containing information concerning an associated Ethernet packet, then reaches the QM, which checks that the domain ID associated with a request is allowed to access the queue. If it is, then the message is enqueued. The domain mapping table must be programmed as well to make sure that this domain ID has write access to the queue. Concerning the look aside classifier, DMA, OCM, SEC or Ethernet egress, the subsystem needs to first check that the domain ID specified in the work message matches the domain ID of the freepool message pointed by the FPSel. This check is performed in order to not corrupt data.

A queue and traffic manager (QMTM) or resource traffic management subsystem may be used to virtualize system resources and share them on a real-time basis with all the guest OSs. The QMTM provides a group of queues that can be provisioned for use by a particular domain ID. The QMTM also provides various arbitration schemes between a group of queues that are configured to access a shared resource. In addition, the QMTM allows a shared resource to return completion indications to different queues that are assigned to the different domains.

By providing separate queues that can access a shared resource while using a configured arbitration scheme, the QMTM allows the guest OSs to have separate and dedicated queues that fit into their own memory region, but access a shared resource. This guarantees that the queue is always available for use by a first guest OS that owns it and insures that another guest OS cannot use up the queue and prevent the first guest OS from accessing the shared resource or prevent the first guest OS from receiving its configured bandwidth to that resource.

By providing the ability for a shared resource to return completion and other status information to different queues, a shared resource can send this information back to the guest OS that made that request directly and place the information in a memory partition that is owned by that guest OS.

Each queue keeps track of the domain ID to which it belongs, and forwards the domain ID of the queue owner along with any transaction that was queued into that queue and sent to a shared resource. In this manner, the shared resource knows the domain ID to which that particular transaction belongs and can use this information when it needs to access some other resource. Thus, each transaction and access has associated with it a source, where the source is the originating processor domain ID.

A separate interrupt controller is assigned to each domain. This allows the source processor to generate an interrupt and have it steered to the guest OS that is the cause of the processing that results in an interrupt. Each guest OS can also independently control interrupt reporting and processing by using its own set of mask bits and reporting hierarchy.

Since each transaction and access includes the domain ID associated with that transfer, each transaction and access can be checked for access rights and permissions. Additionally, the domain ID can be used to apply the provisioned bandwidth for that guest OS and guarantee that each guest OS is getting its fair share of the bandwidth.

Figure 2:
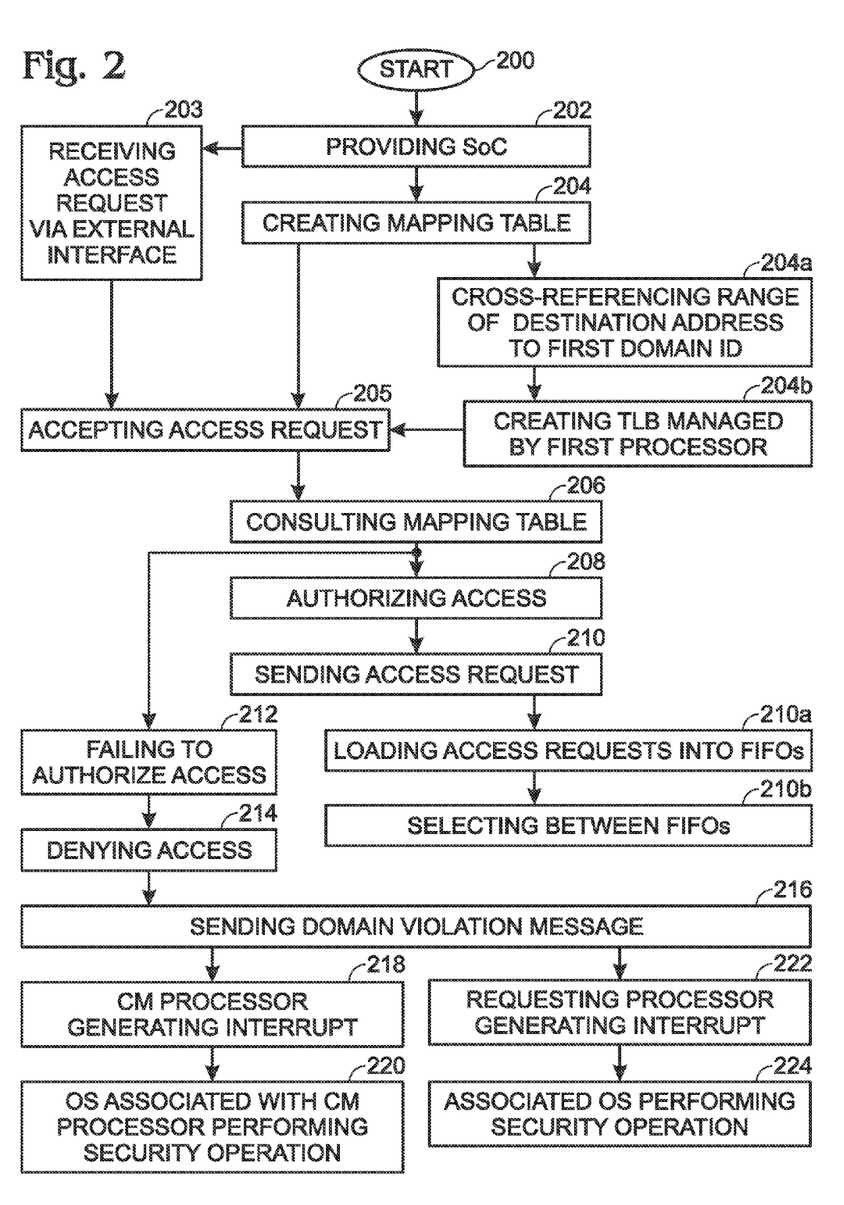
FIG. 2 is a flowchart illustrating a method for partitioning access to resources in a SoC with a plurality of OSs.

FIG. 2 is a flowchart illustrating a method for partitioning access to resources in a SoC with a plurality of OSs. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 200.

Step 202 provides an SoC with a plurality of processors, including a configuration master (CM) processor, a memory, a plurality of OSs enabled as a sequence of software instructions stored in the memory and executable by a processor, and accessible resources divided into a plurality of domains. Examples of accessible resources include a memory (internal and external to the SoC), an interface, and a computer hardware accelerator. In one aspect, there is a one-to-one correspondence between processors and OSs. Step 204 creates a mapping table with a plurality of entries. Each entry cross-references a range of destination addresses with a domain ID), where each domain ID is associated with a corresponding processor. Step 205 accepts access requests to the resource from the plurality of processors. Each access request includes a domain ID and a destination address. Step 206 consults the mapping table to determine the range of destination addresses associated with the access request domain IDs. Step 208 authorizes the accesses in response to the access request destination addresses matching the range of destination addresses in the mapping table. Step 210 sends the authorized access requests to the destination addresses of the requested resources. Step 212 fails to authorize an access request in response to the access request domain ID not cross-referencing to the range of destination addresses in the mapping table. Step 214 denies access to the requested resource.

In one aspect, creating the mapping table in Step 204 includes the CM processor performing a provisioning operation such as writing destination addresses and associated domain IDs into the mapping table, or modifying the destination addresses and associated domain IDs in the mapping table.

In another aspect, Step 216 sends a domain violation sideband message to the requesting processor, to the CM processor, or both processors, in response to denying access to a resource (Step 214). In Step 218 the CM processor may generate an interrupt message for an associated OS in response to receiving a domain violation sideband message that a first OS initiated an unauthorized access. Then, in Step 220, the OS associated with the CM processor performs a security operation such as forcing the first OS to reboot, monitoring the number of unauthorized accesses made by the first OS, or halting the first OS if unauthorized accesses occur after rebooting.

In Step 222 the requesting processor may generate an interrupt message for an associated first OS in response to receiving a domain violation sideband message that the first OS initiated an unauthorized access (Step 216). Then, in Step 224, the first OS performs a security operation such as rebooting or halting a software application running on the first OS.

In one aspect, Step 202 provides an accessible resource memory with a first domain, with a first domain ID assigned to a first processor, and a second domain, with a second domain ID assigned to both the first processor and a second processor.

In another aspect, Step 202 associates a first OS and a second OS to a first processor. Then, creating the mapping table in Step 204 includes substeps. Step 204a cross-references a first range of destination addresses to a first domain ID, associated with the first processor. Step 204b creates a TLB managed by the first processor. The TLB includes a first sub-field of destination addresses from the first range cross-referenced to a first virtual domain ID and associated with the first OS, and a second sub-field of destination addresses from the first range cross-referenced with the second virtual domain ID and associated with the second OS.

In another aspect, Step 202 provides a resource traffic management subsystem including a plurality a input FIFO queues connected to a first accessible resource, including a first input FIFO associated with the a first domain ID and a second input FIFO queue associated with a second domain ID. Creating the mapping table in Step 204 includes cross-referencing first accessible resource destination addresses with the first domain ID assigned to a first processor, and with the second domain ID assigned to a second processor. Step 210 sends the authorized access requests to the destination addresses of the first accessible resource with the following substeps. Step 210a loads authorized access requests in the input FIFO queue associated with the same domain ID. In Step 210b a queue manager selects between input FIFO queues.

In one aspect, Step 202 provides a SoC external interface. Step 203 receives an access request to a first destination address, with a domain ID associated with an external device, via the external interface, directed to the partitioning module. Authorizing the access in Step 208 includes authorizing access to the first destination address in response to accessing the range of destination addresses associated with the external device domain ID and matching the range of destination addresses in the mapping table associated with the external device.

A system and method have been provided for partitioning access to resources between processors in an SoC. Examples of particular message structures, processors, and hardware units have been presented to illustrate the invention. However, the invention is not limited to merely these examples. Other variations and embodiments of the invention will occur to those skilled in the art.

We claim:

1. A system, comprising:
    a configuration processor;
    a partitioning microcontroller configured for generating a mapping table comprising a register, the register cross-referencing a destination address with a domain ID, where the domain ID is associated with a corresponding processor;
    an interface configured for accepting an access request to an accessible resource from a processor, the access request comprising an access request domain ID and a destination address, wherein the configuration processor reassigns the access request to another processor, the other processor being selected based on cross referencing the access request destination address and the access request domain ID; and
    a partition master configured for accessing the destination address associated with the access request domain ID specified in the access request, and authorizing the access request in response to the access request destination address matching the destination address in the mapping table, wherein the interface is further configured for sending the authorized access request to the destination address of the requested resource.

2. The system of claim 1 wherein the configuration processor is further configured for performing an operation comprising writing a destination address or associated domain ID into a partitioning module mapping table and modifying the destination address and associated domain ID in the partitioning module mapping table.

3. The system of claim 1 wherein the partition master is configured for denying access to the requested resource in response to the access request domain ID not cross-referencing to the destination address in the mapping table.

4. The system of claim 3 wherein the partition master is further configured for sending a domain violation sideband message to the requesting processor and to the configuration processor, in response to denying access to a resource.

5. The system of claim 4 wherein the configuration processor is configured for sending an interrupt message to an operating system associated with the requesting processor in response to receiving a domain violation sideband message that the requesting processor initiated an unauthorized access; and
    wherein an operating system associated with the configuration processor performs an operation comprising forcing the operating system associated with the requesting processor to reboot, monitoring a number of unauthorized accesses made by the operating system associated with the requesting processor, or halting the operating system associated with the requesting processor if an unauthorized access occur after rebooting.

6. The system of claim 4 wherein the requesting processor is configured for sending an interrupt message to an operating system associated with the requesting processor in response to receiving a domain violation sideband message that the operating system initiated an unauthorized access; and
    wherein the operating system is configured for performing an operation comprising rebooting or halting a software application running on the first OS.

7. The system of claim 1 wherein the accessible resource comprising at least one of a memory, an interface, and a computer hardware accelerator.

8. The system of claim 1 wherein the accessible resource is at least one of a memory with a first domain, with a first domain ID assigned to a first processor, and a second domain, with a second domain ID assigned to both the first processor and a second processor.

9. The system of claim 1 wherein there is a one-to-one correspondence between a plurality of processors and operating systems.

10. The system of claim 1 wherein the mapping table cross-references a first range of destination addresses to a first domain ID, associated with a first processor from a plurality of processors;
 wherein a first operating system and a second operating system are associated with the first processor;
 the system further comprising:
  a translation lookaside buffer managed by the first processor, the translation lookaside buffer including a first sub-field of a destination address from the first range of destination addresses cross-referenced to a first virtual domain ID and associated with the first operating system, and a second sub-field of a destination address from the first range of destination addresses cross-referenced with a second virtual domain ID and associated with the second operating system.

11. The system of claim 1 wherein the accessible resource has destination addresses associated with a first domain ID assigned to a first processor and a second domain ID assigned to a second processor;
 the system further comprising:
 a resource traffic management subsystem comprising:
  a plurality of input first-in first-out queues communicably coupled to the accessible resource, comprising a first input first-in first-out queue associated with the first domain ID and a second input first-in first-out queue associated with the second domain ID, each of the queues having a head to accept an authorized access request and a tail connected to the accessible resource; and
  a queue manager for selecting between the input queues.

12. The system of claim 1 further comprising:
 an external interface to receive another access request to a first destination address, with a domain ID associated with an external device; and
 wherein the partition master is further configured for authorizing the access to the first destination address in response to accessing the destination address associated with the external device domain ID and matching the destination address in the mapping table associated with the external device.

13. A method for partitioning access to a resource, the method comprising:
 creating a mapping table comprising an entry that cross references a destination address with a domain ID, wherein the domain ID is associated with a corresponding processor;
 receiving an access request to a resource from a processor, the access request comprising an access request domain ID and a destination address;
 assigning the access request to another processor, the other processor being selected based on cross referencing the access request destination address and the access request domain ID;
 determining a destination address associated with the access request domain ID;
 authorizing the access in response to the access request destination address matching the destination address in the mapping table; and
 sending the authorized access request to the destination address of the requested resource.

14. The method of claim 13 wherein creating the mapping table comprises writing the destination address and associated domain ID into the mapping table or modifying the destination address and associated domain ID in the mapping table.

15. The method of claim 13 further comprising:
 denying an access request in response to the access request domain ID not cross-referencing to the destination address in the mapping table.

16. The method of claim 15 further comprising:
 sending a domain violation sideband message to the requesting processor and to a configuration processor, in response to denying access to the resource.

17. The method of claim 16 further comprising:
 generating an interrupt message for an operating system associated with the requesting processor in response to receiving a domain violation sideband message that the associated operating system initiated an unauthorized access; and
 performing at least one of forcing the associated operating system to reboot, monitoring a number of unauthorized accesses made by the associated operating system, and halting the associated operating system if an unauthorized access occurs after rebooting.

18. The method of claim 13 wherein the resource comprises at least one of a memory, an interface, and a computer hardware accelerator.

19. The method of claim 13 wherein the resource comprises a memory with a first domain, with a first domain ID assigned to a first processor, and a second domain, with a second domain ID assigned to both the first processor and a second processor.

20. The method of claim 13 wherein there is a one-to-one correspondence between a plurality of processors and operating systems.

21. The method of claim 13 further comprising:
 associating a first operating system and a second operating system to a first processor;
 cross-referencing a first range of destination addresses to a first domain ID, associated with the first processor;
 creating a translation lookaside buffer managed by the first processor, the translation lookaside buffer including a first sub-field of a destination address from the first range of destination addresses cross-referenced to a first virtual domain ID and associated with the first operating system, and a second sub-field of a destination address from the first range of destination addresses cross-referenced with a second virtual domain ID and associated with the second operating system.

22. The method of claim 13, wherein the creating the mapping table comprises cross-referencing the resource destination address with the first domain ID assigned to a first processor, and with the second domain ID assigned to a second processor;
 wherein sending the authorized access request to the destination address of the first accessible resource comprises:
  loading the authorized access request in an input first in first out memory queue associated with the same domain ID for each of the domain IDs; and
  selecting between the input first in first out memory queues.

23. The method of claim 13, further comprising:
 receiving another access request to a first destination address, with a domain ID associated with an external device, via the external interface; and
 wherein authorizing the access comprises authorizing access to the first destination address in response to accessing the destination address associated with the external device domain ID and matching the destination address in the mapping table with the external device.

24. A non-transitory computer-readable storage device comprising computer-executable instructions that, in response to execution, cause a system comprising a processor to perform operations, comprising:
- creating a mapping table with a register, the register cross-referencing a destination address with a domain ID, wherein the domain ID is associated with a corresponding operating system;
- accepting an access request to an accessible resource from a operating system, the access request including an access request domain ID and a destination address;
- assigning the access request to another processor, the other processor being selected based on cross referencing the access request destination address and the access request domain ID;
- accessing the destination address associated with the access request domain ID, and authorizing the access in response to the access request destination address matching the destination addresses in the mapping table.

* * * * *